O. H. Perry.

101502

Impt in Turning Lathes. PATENTED APR 5 1870

Witnesses:

Inventor:
Oliver H Perry
by Chas. C. Tucker & Co
his Attys in fact

United States Patent Office.

OLIVER H. PERRY, OF GOLCONDA, ILLINOIS.

Letters Patent No. 101,502, dated April 5, 1870.

IMPROVEMENT IN WOOD-TURNING LATHES.

The Schedule referred to in these Letters Patent and making part of the same.

I, OLIVER H. PERRY, of Golconda, in the county of Pope and State of Illinois, have invented certain Improvements in Turning-Lathes, of which the following is a specification.

Nature and Objects of the Invention.

My invention consists of an improvement on the old dead spindle of turning-lathes, with a revolving spindle attached, by introducing a drum over them, tightened by means of a nut screwed on the dead spindle, connecting it with the drum, and a nut over the revolving spindle, screwed into the drum, to steady the revolving spindle and reduce the friction.

Description of the Accompanying Drawings.

Figure 1:
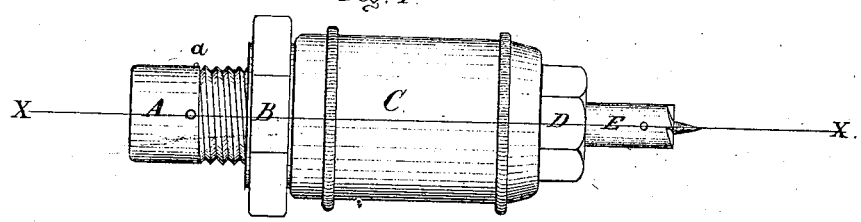
Figure 1 represents the old spindle, with my improvements attached.
Figure 2:
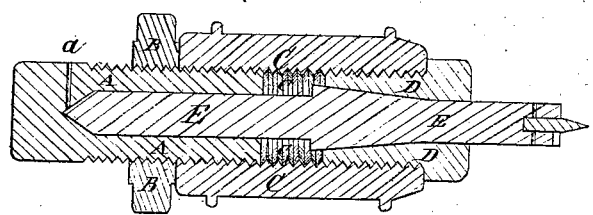
Figure 2 represents the inside of my improvement as attached to the old spindle.

General Description.

A and E represent the old and revolving spindles, with my improvements attached.

C represents the drum, supporting the revolving spindle E.

B represents the nut, working on the old dead spindle, for the purpose of tightening the drum, and D is the nut screwed into the drum, for the purpose of steadying the revolving spindle E.

On the top of the old spindle A is an oil-hole, $a$, by means of which the end of the revolving spindle E is oiled, to prevent friction.

Claim.

I claim as my invention—

The drum C, jam-nut B, and the collar-nut D, in connection with the spindle A and center E, when constructed and operating as and for the purposes hereinbefore set forth.

OLIVER H. PERRY.

Witnesses:
   E. J. HUDSON,
   JOHN M. RAUM.